US011669852B2

(12) United States Patent
Tanaka et al.

(10) Patent No.: US 11,669,852 B2
(45) Date of Patent: Jun. 6, 2023

(54) WALLET SERVER, WALLET SYSTEM, AND COMPUTER-READABLE RECORDING MEDIUM

(71) Applicant: TOYOTA JIDOSHA KABUSHIKI KAISHA, Toyota (JP)

(72) Inventors: Yurika Tanaka, Yokosuka (JP); Hideo Hasegawa, Nagoya (JP); Nozomu Yoshioka, Kasugai (JP); Tsuyoshi Takeshita, Nagoya (JP); Shoichiro Suzuki, Tokyo (JP); Kohei Ichihara, Machida (JP); Shota Yamamoto, Tokyo (JP); Junya Chikanishi, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/241,179

(22) Filed: Apr. 27, 2021

(65) Prior Publication Data
US 2021/0383420 A1 Dec. 9, 2021

(30) Foreign Application Priority Data

Jun. 9, 2020 (JP) .............................. JP2020-100084

(51) Int. Cl.
*G06Q 30/0217* (2023.01)
*G06Q 30/0282* (2023.01)
(Continued)

(52) U.S. Cl.
CPC ....... *G06Q 30/0217* (2013.01); *G06Q 20/202* (2013.01); *G06Q 20/36* (2013.01);
(Continued)

(58) Field of Classification Search
CPC .. G06Q 30/0217; G06Q 20/202; G06Q 20/36; G06Q 30/0282; G06Q 20/3274;
(Continued)

(56) References Cited

U.S. PATENT DOCUMENTS 8,089,346 B2 * 1/2012 Sugurappa Angadi ......................
G06Q 30/06
340/286.09
9,519,899 B2 * 12/2016 White .................. G06Q 20/425
(Continued)

FOREIGN PATENT DOCUMENTS

JP 2007-156762 A 6/2007

OTHER PUBLICATIONS

Automated Food Ordering System with Real-Time Customer Feedback International Journal of Advanced Research in Computer Science and Software Engineering Tanpure, Shidankar, Joshi Research Paper, 2013 (Year: 2013).*

*Primary Examiner* — Alexandru Cirnu
(74) *Attorney, Agent, or Firm* — Oliff PLC

(57) ABSTRACT

In a wallet server including a processor having hardware, the processor acquires image information that includes a captured image of food provided to a user transmitted from a store terminal of a store providing the food, and user information related to the user provided with the food, and associates the acquired image information with the user information and transmits a display instruction to instruct display of the image information and a screen for accepting input of evaluation for the food to a user terminal of the user determined based on the user information.

18 Claims, 9 Drawing Sheets

(51) Int. Cl.
   *G06Q 20/36* (2012.01)
   *G06Q 20/20* (2012.01)
   *G06Q 40/02* (2023.01)
   *G06F 3/0482* (2013.01)
   *G06Q 20/32* (2012.01)
   *G06N 20/00* (2019.01)

(52) U.S. Cl.
   CPC ....... *G06Q 30/0282* (2013.01); *G06F 3/0482* (2013.01); *G06N 20/00* (2019.01); *G06Q 20/204* (2013.01); *G06Q 20/208* (2013.01); *G06Q 20/3274* (2013.01); *G06Q 20/3278* (2013.01); *G06Q 40/02* (2013.01)

(58) Field of Classification Search
   CPC .... G06Q 20/204; G06Q 20/208; G06Q 40/02; G06Q 20/3278; G06Q 20/367; G06Q 30/0207; G06N 20/00; G06F 3/0482
   See application file for complete search history.

(56) References Cited

U.S. PATENT DOCUMENTS

| | | | | |
|---|---|---|---|---|
| 2011/0119154 | A1* | 5/2011 | Lombardi | G06Q 30/0613 705/26.41 |
| 2013/0173404 | A1* | 7/2013 | Scipioni | G06Q 30/0282 705/16 |
| 2017/0300943 | A1* | 10/2017 | Saadatfar | G06Q 30/0203 |
| 2018/0032939 | A1* | 2/2018 | Balakrishnan | G06K 9/00335 |
| 2018/0285465 | A1* | 10/2018 | Schaffernoth | G06F 16/29 |
| 2018/0308100 | A1* | 10/2018 | Haukioja | G06N 5/04 |
| 2019/0295065 | A1* | 9/2019 | Han | G06Q 20/3223 |

\* cited by examiner

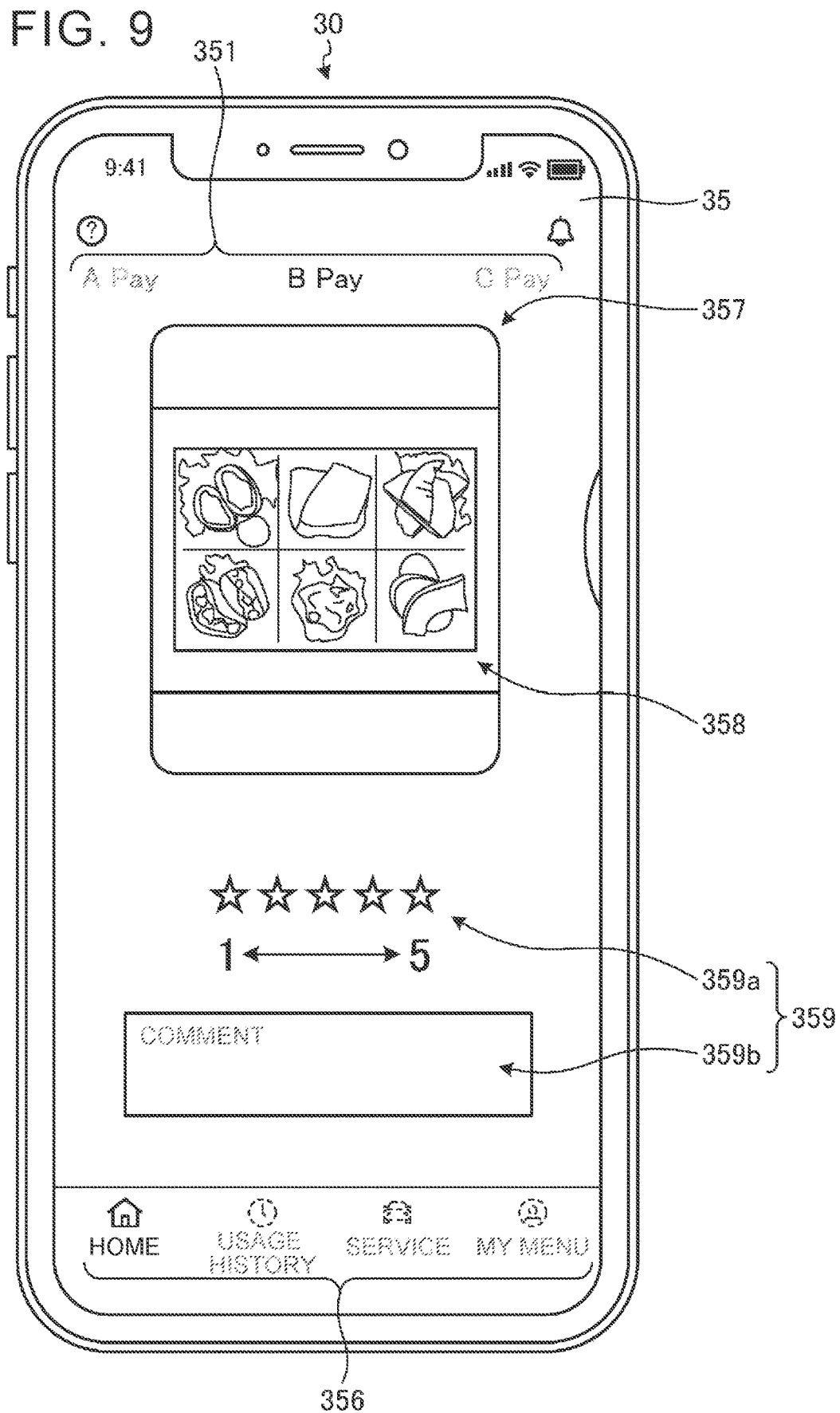

WALLET SERVER, WALLET SYSTEM, AND COMPUTER-READABLE RECORDING MEDIUM

CROSS-REFERENCE TO RELATED APPLICATION

This application claims priority to Japanese Patent Application No. 2020-100084 filed on Jun. 9, 2020, incorporated herein by reference in its entirety.

BACKGROUND

1. Technical Field

The present disclosure relates to a wallet server, a wallet system, and a computer-readable recording medium.

2. Description of Related Art

Japanese Unexamined Patent Application Publication No. 2007-156762 (JP 2007-156762 A) discloses a technique in which, when a collection server acquires customer satisfaction data (CS data) for a store from a user terminal, the acquired CS data is divided into various categories for each store ID and aggregated to calculate the total or average value of satisfaction in the categories.

SUMMARY

It has been extremely complicated to evaluate each food item provided in a store such as a restaurant. Therefore, there has been a demand for a technique that can collect evaluations of not only the entire store but also each food item provided, and that can collect information for more detailed marketing.

An object of the present disclosure is to provide a wallet server, a wallet system, and a computer-readable recording medium that can collect evaluations for each food item provided in a store or the like and obtain information for more detailed food marketing.

A wallet server according to the present disclosure includes a processor provided with hardware. The processor acquires image information that includes a captured image of food provided to a user transmitted from a store terminal of a store providing the food, and user information related to the user provided with the food, and associates the acquired image information with the user information and outputs a display instruction to instruct display of the image information and a screen for accepting input of evaluation for the food to a user terminal of the user determined based on the user information.

A wallet system according to the present disclosure includes: a first device including a first processor that is provided with hardware installed in a store providing food and that transmits payment settlement information including a content related to payment settlement; a second device including a second processor that is provided with hardware possessed by a user and that transmits, when the user inputs selection information, the input selection information; and a third device including a third processor that is provided with hardware, the third processor acquiring image information including a captured image of food provided to a user and transmitted from the first device, and user information related to the user provided with the food, associating the acquired image information with the user information, and transmitting a display instruction to instruct display of the image information and a screen for accepting input of evaluation for the food to the second device of the user determined based on the user information.

A computer-readable recording medium according to the present disclosure stores a program that causes a processor provided with hardware to execute: acquiring image information that includes a captured image of food provided to a user from a store terminal of a store providing the food, and user information related to the user provided with the food; and associating the acquired image information with the user information and outputs a display instruction to instruct display of the image information and a screen for accepting input of evaluation for the food to a user terminal of the user determined based on the user information.

According to the present disclosure, it is possible to collect evaluations for each item of foods provided in stores and the like, and to obtain more detailed information for food marketing.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 9 is a diagram showing an example in which a stepwise evaluation level is displayed on the operation display unit of the user terminal in the wallet system according to the embodiment.

DETAILED DESCRIPTION OF EMBODIMENTS

Hereinafter, embodiments of the present disclosure will be described below with reference to the drawings. In all the drawings of the following embodiments, the same or corresponding portions are designated by the same reference signs. Further, the present disclosure is not limited to the embodiments described below. The components in the following embodiments also include those that can be easily replaced by those skilled in the art, or those that are substantially identical.

Wallet System

Figure 1:
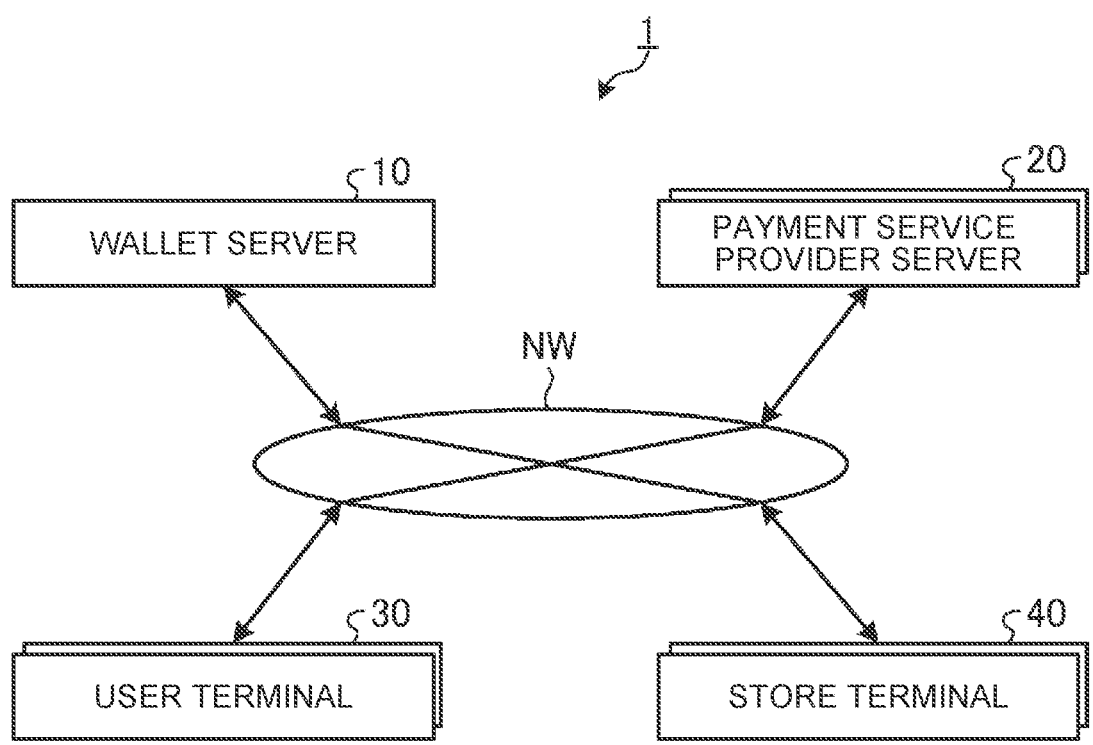
FIG. 1 is a diagram schematically showing a configuration of a wallet system according to an embodiment.

A configuration of a wallet system according to an embodiment will be described. As shown in FIG. 1, a wallet system 1 includes a wallet server 10, a payment service provider server 20, a user terminal 30, and a store terminal 40.

The wallet server 10, the payment service provider server 20, the user terminal 30, and the store terminal 40 are configured to be communicable with each other via a network NW. The network NW is composed of, for example, the Internet network and a mobile phone network. The network NW may include, for example, other communication networks such as a wide area network (WAN), a telephone communication network such as a mobile phone, and a wireless communication network such as Wi-Fi (registered trademark).

Wallet Server

Figure 2:
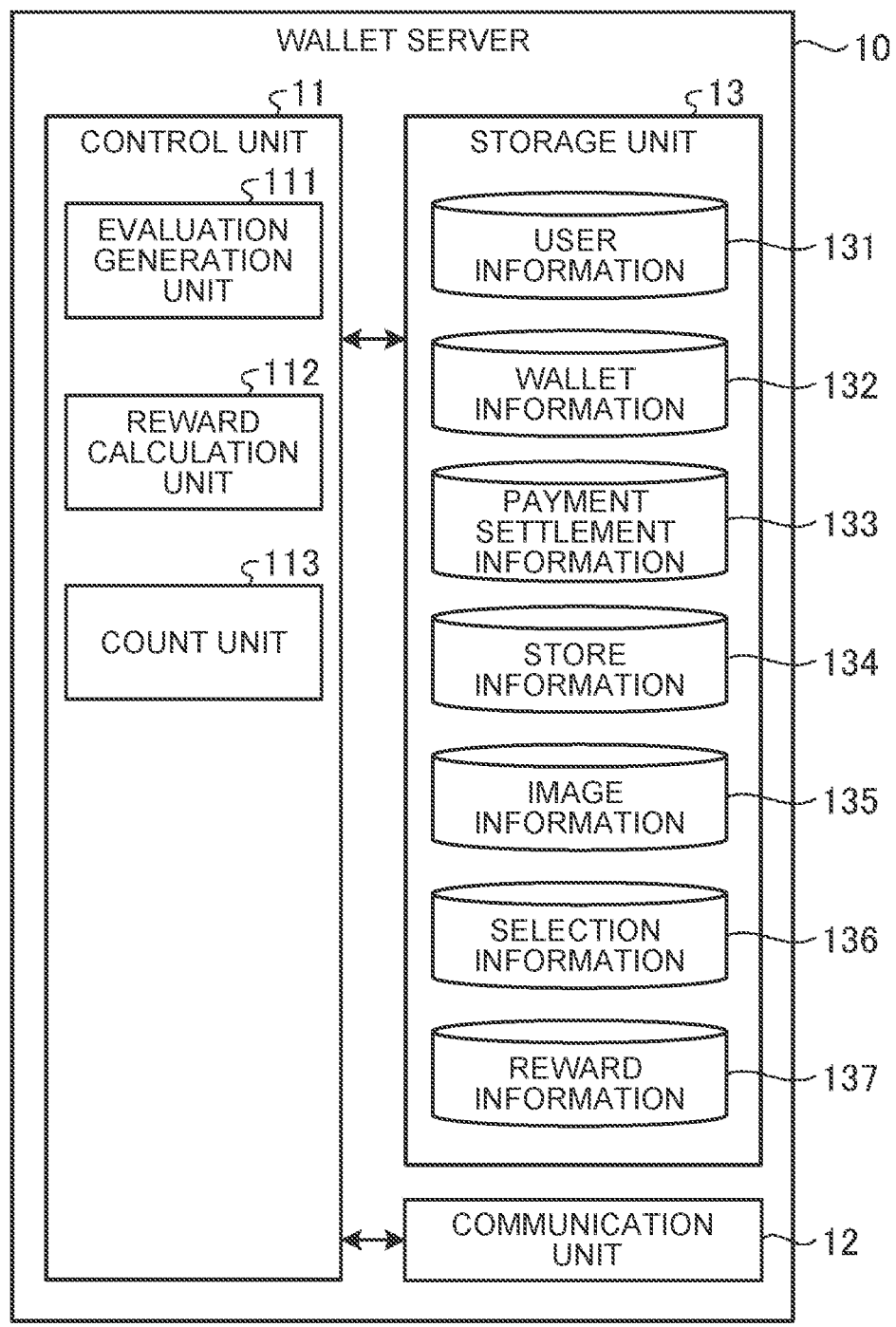
FIG. 2 is a block diagram schematically showing a configuration of a wallet server according to the embodiment.

The wallet server 10 as a third device including a wallet server is a server for comprehensively managing the wallet system according to the present embodiment, and is managed by a wallet system administrator. As shown in FIG. 2, the wallet server 10 includes a control unit 11 as a third processor, a communication unit 12, and a storage unit 13.

Specifically, the control unit 11 is composed of a processor that is provided with hardware, such as a central processing unit (CPU), a digital signal processor (DSP), and a field-programmable gate array (FPGA), and a main storage unit, such as a random access memory (RAM) and a read-only memory (ROM). The storage unit 13 includes, for example, a recording medium selected from an erasable programmable ROM (EPROM), a hard disk drive (HDD), and a removable medium, etc. Examples of the removable media include disc recording media such as a universal serial bus (USB) memory, a compact disc (CD), a digital versatile disc (DVD), and a Blu-ray (registered trademark) disc (BD). The storage unit 13 can store an operating system (OS), various programs, various tables, and various databases, etc. The control unit 11 loads a program stored in the storage unit 13 into a work area of the main storage unit and executes the loaded program, and controls each component unit, etc. through execution of the program. The program may be a learned model generated through machine learning, for example. The learned model can be generated through machine learning such as deep learning using a neural network, for example, with an input-output data set of a predetermined input parameter and an output parameter as teaching data. As a result, the control unit 11 can realize the functions of an evaluation generation unit 111, a reward calculation unit 112, and a count unit 113. The details of the functions of the evaluation generation unit 111, the reward calculation unit 112, and the count unit 113 will be described later.

The communication unit 12 as an information acquisition unit is composed of, for example, a local area network (LAN) interface board or a wireless communication circuit for wireless communication. The LAN interface board and the wireless communication circuit are connected to the network NW such as the Internet, which is a public communication network. The communication unit 12 connects to the network NW and communicates with the payment service provider server 20, the user terminal 30, and the store terminal 40.

The storage unit 13 according to the present embodiment stores user information 131, wallet information 132, and payment settlement information 133 for each user of the wallet system 1. Further, the storage unit 13 stores store information 134, image information 135, selection information 136, and reward information 137.

The user information 131 is information about the user who uses the wallet system 1. Examples of the user information 131 include, for example, a user ID, a password, a user name, user contact information (for example, an address, a telephone number, and an e-mail address), usage registration history, and information on payment means registered as deposit means, information on payment means registered as payment settlement means, and a password for making a payment settlement, of a user who has registered for use of the wallet system. The user ID and the password in the user information 131 are used for authentication processing such as logging in to the wallet server 10.

The wallet information 132 is information related to a wallet of the wallet system 1. The wallet is a virtual deposit and withdrawal account of electronic money. The wallet information 132 includes, for example, the user ID, a balance of the electronic money, a deposit history of the electronic money, and a usage history of the electronic money.

The payment settlement information 133 is information related to payment settlement of the wallet system. The payment settlement information 133 includes the user ID, a payment settlement method used for making a payment settlement (e.g. payment by the electronic money (non-contact payment), payment by scanning, or payment by code), date and time information containing a date and time when the payment settlement is made, and a payment settlement history.

The store information 134 is information relating to facilities and terminals of the stores that use the wallet system 1. The store information 134 contains, for example, location information, information on foods, menus and services available, information on business dates and times, and information on coupons and campaigns, of store facilities such as various restaurants and cafeterias that provide food and services.

The image information 135 includes image data of food provided in the store that is directly captured. The image information 135 includes image data of the food itself captured by an imaging unit 46 provided in each store.

The selection information 136 is information or the like selected by the user on the user terminal 30. The selection information 136 includes information on the evaluation of the food by the user. The selection information 136 includes information such as evaluation information selected from two options such as "delicious" or "unpleasant" for the food, and evaluation information evaluated by the user as to which evaluation level the food applies to from a plurality of levels, for example, from three levels, five levels, and ten levels.

The reward information 137 includes information on the reward provided to the user when the food provided by the store or the like is evaluated using the user terminal 30. The reward information 137 may include campaign information, reward point information, and the like regarding a campaign executed by a store, a payment service provider, or the like.

Payment Service Provider Server

Figure 3:
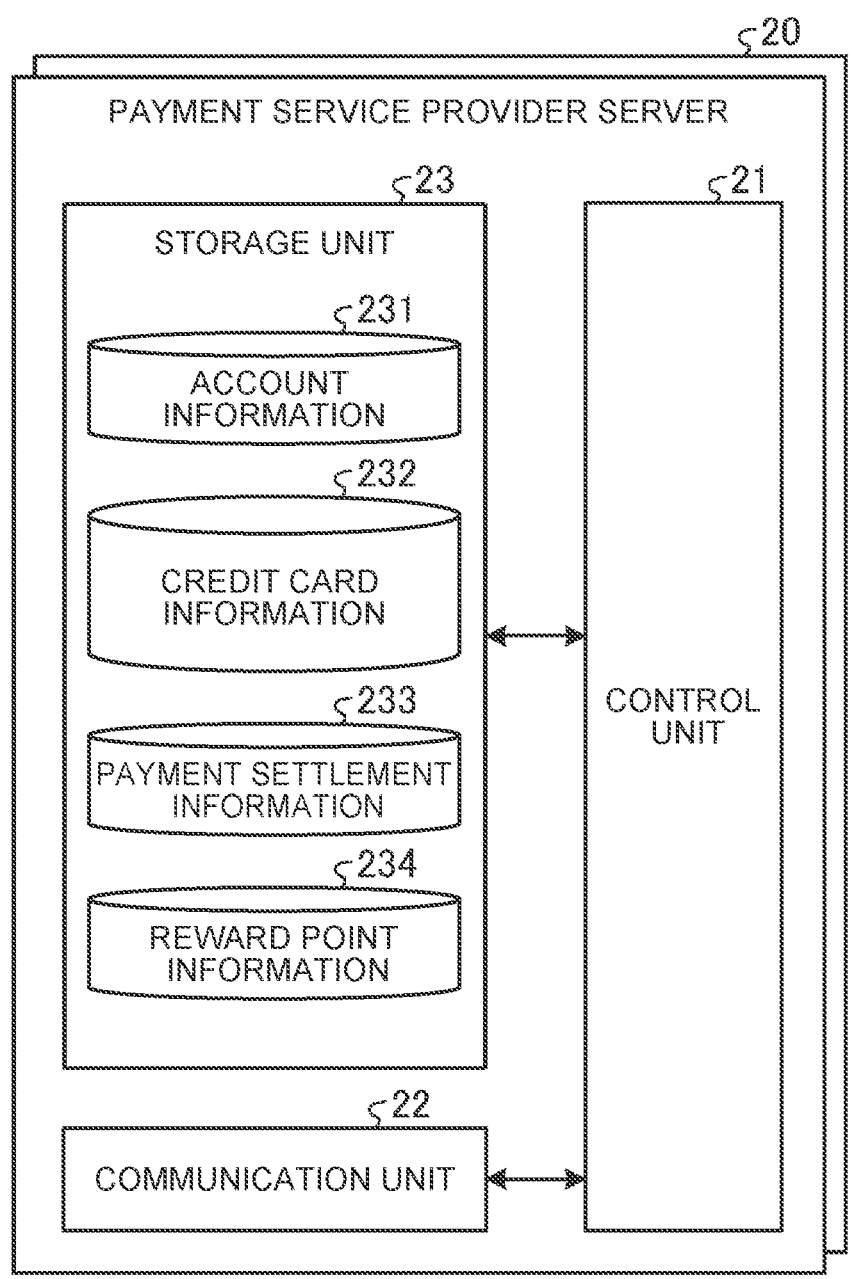
FIG. 3 is a block diagram schematically showing a configuration of a payment service provider server according to the embodiment.

The payment service provider server 20 is a server for managing an account and a credit card of the user. The payment service provider server 20 is installed in a financial institution such as a bank, a Shinkin bank, a credit union, or a labor bank, or a credit card company. As shown in FIG. 3, the payment service provider server 20 includes a control unit 21, a communication unit 22, and a storage unit 23. The control unit 21, the communication unit 22, and the storage unit 23 are functionally the same as the control unit 11, the communication unit 12, and the storage unit 13, respectively.

The storage unit 23 stores account information 231, credit card information 232, payment settlement information 233, and reward point information 234 for each user of the wallet system 1. The account information 231 contains, for example, the name of the user, an account number, an account balance, and a deposit and withdrawal history. The credit card information 232 contains, for example, the name of the user, a credit card number, an expiration date of the credit card, a usage limit amount, and a card usage history. Examples of the payment settlement information 233 include the user ID, the payment settlement means, and the payment settlement history. Examples of the reward point information 234 include, for example, the name of the user, a unique user ID, the number of reward points associated with the account information or the credit card information. The storage unit 23 may further store campaign information that is information on reward points returned and various campaigns held by a payment settlement service provider. Examples of the campaign information include information on the reward point rate when a predetermined payment settlement method is used, information on an area where the campaign is carried out, and information on coupons provided to the user.

User Terminal

The user terminal 30 is a computer terminal operated by the user. Examples of the user terminal 30 include smartphones, mobile phones, tablet terminals, wearable computers, and personal computers held by the user, and car navigation systems mounted on vehicles. The user terminal 30 may be any terminal as long as the user terminal 30 can transmit and receive information to and from the wallet server 10.

Figure 4:
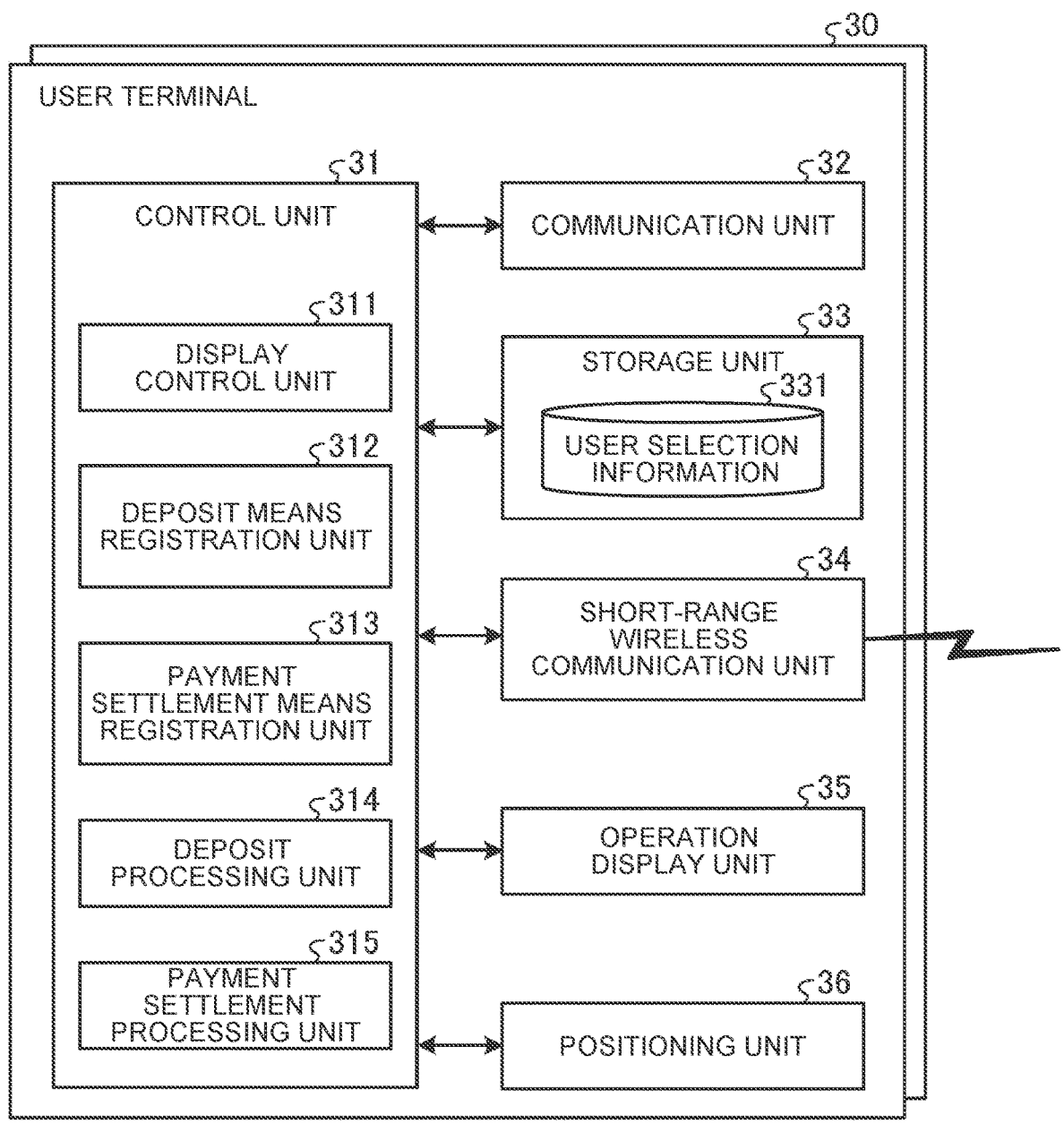
FIG. 4 is a block diagram schematically showing a configuration of a user terminal according to the embodiment.

As shown in FIG. 4, the user terminal 30 as a second device includes a control unit 31, a communication unit 32, a storage unit 33, a short-range wireless communication unit 34, an operation display unit 35, and a positioning unit 36. The control unit 31, the communication unit 32, and the storage unit 33 are functionally the same as the control unit 11, the communication unit 12, and the storage unit 13 in the wallet server 10 shown in FIG. 2, respectively. As shown in FIG. 4, the control unit 31 as a second processor functions as a display control unit 311, a deposit means registration unit 312, a payment settlement means registration unit 313, a deposit processing unit 314, and a payment settlement processing unit 315.

The display control unit 311 controls contents to be displayed on an operation display unit 35 including a display. The display control unit 311 displays, for example, a member registration screen when the user registers as a member, a log-in screen when the user logs in to the wallet system 1, and a deposit screen when the user deposits money to the electronic money of the wallet, and a payment settlement screen when the user makes a payment settlement, on the operation display unit 35 to be operated based on user operations such as a touch operation and a flick operation by the user. Further, the display control unit 311 acquires the image data captured by the imaging unit 46 controlled by the store terminal 40 and displays the image data on the operation display unit 35. The display control unit 311 transitions each screen based on the operations by the user.

The deposit means registration unit 312 registers the deposit means for depositing money to the electronic money. The deposit means registration unit 312 transmits, to the wallet server 10, a deposit means registration request for registering a plurality of different payment settlement methods operated by a plurality of service providers as means of depositing money to the electronic money. Specifically, the different payment settlement methods operated by the service providers includes, for example, the bank account and the credit card. The control unit 11 of the wallet server 10 that receives the deposit means registration request from the deposit means registration unit 312 stores the payment settlement method contained in the deposit means registration request in the storage unit 13 as the user information 131 and registers the payment settlement method as the deposit means.

The payment settlement means registration unit 313 registers various payment settlement means. The payment settlement means registration unit 313 transmits a payment settlement means registration request for registering the payment settlement means to the wallet server 10. The control unit 11 of the wallet server 10 that receives the payment settlement means registration request from the payment settlement means registration unit 313 stores the payment settlement method contained in the payment settlement means registration request in the storage unit 13 as the user information 131 to register the payment settlement method as the payment settlement means. In addition, a payment settlement method may be registered instead of the payment settlement means.

The deposit processing unit 314 deposits money to the electronic money in the wallet. Specifically, the deposit processing unit 314 transmits, to the wallet server 10, a deposit request for depositing money to the electronic money using the payment settlement means registered as the deposit means. The control unit 11 of the wallet server 10 that receives the deposit request from the deposit processing unit 314 increments a balance of the electronic money in the wallet based on deposit amount information contained in the deposit request. That is, the control unit 11 updates the wallet information 132 stored in the storage unit 13 in accordance with an increment in the balance of the electronic money in the wallet.

The payment settlement processing unit 315 executes payment settlement using the payment settlement method selected by the user. Specifically, the payment settlement processing unit 315 transmits a payment settlement request to the store terminal 40 via the short-range wireless communication unit 34 as the payment settlement means. The payment settlement processing unit 315 may transmit the payment settlement request to the store terminal 40 by reading a barcode or a QR code (registered trademark) displayed on the store terminal 40 using a camera, etc. of the user terminal 30 as the payment settlement means. The payment settlement processing unit 315 may transmit the payment settlement request to the store terminal 40 by causing a code reader, etc., of the store terminal 40 to read a barcode or a QR code (registered trademark) displayed on the user terminal 30 as the payment settlement means. The payment settlement request transmitted from the payment settlement processing unit 315 to the store terminal 40 may or may not contain information indicating a payment settlement amount (hereinafter referred to as "payment settlement amount information").

When the user makes payment settlement with the bank account or by the credit card, the payment settlement processing unit 315 transmits the payment settlement request to the wallet server 10 to make a payment settlement using any of the payment settlement means. The control unit 11 of the wallet server 10 that receives the payment settlement request from the payment settlement processing unit 315 transmits the payment settlement amount information contained in the payment settlement request to the payment service provider server 20.

Further, when the user makes a payment settlement using the electronic money, a control unit 41 of the store terminal 40, which will be described later, transmits the payment settlement request containing the payment settlement amount information to the wallet server 10 via the network NW. The control unit 11 of the wallet server 10 that receives the payment settlement request from the store terminal 40 deducts the payment settlement amount from the balance of the electronic money in the wallet based on the payment settlement amount contained in the payment settlement request. That is, the control unit 11 updates the wallet information 132 and the payment settlement information 133 stored in the storage unit 13 in accordance with the deduction in the balance of the electronic money in the wallet.

The storage unit 33 stores various screen data to be displayed on the operation display unit 35 by the display control unit 311. Further, the storage unit 33 temporarily stores the user information 131, the wallet information 132, the payment settlement information 133, and reward point information 234, for example, as needed. In the example shown in FIG. 4, the storage unit 33 includes user selection information 331 that is information input by the user using the user terminal 30. The user selection information 331 includes information on the evaluation performed by the user on food 100 provided to the user.

The short-range wireless communication unit 34 has a communication function conforming to standards such as near field radio communication (NFC), Bluetooth (registered trademark) low energy (BLE), and infrared data association (IrDA). For example, when the user makes a payment settlement using the electronic money, the user terminal 30 performs short-range wireless communication with the store terminal 40 via the short-range wireless communication unit 34.

The operation display unit 35 is composed of, for example, a touch panel display, and has an input function for receiving an operation using a finger of the user or a pen, and a display function for displaying various types of information under the control of the display control unit 311.

The positioning unit 36 receives radio waves from a global positioning system (GPS) satellite and detects the location information of the user terminal 30. The control unit 31 transmits the location information of the user terminal 30 to the wallet server 10, the payment service provider server 20, or the store terminal 40 via the network NW.

Store Terminal

The store terminal 40 as a first device is installed in, for example, a store (member store) where the wallet system can be used. The store terminal 40 may be a server that also functions as a virtual store opened on the Internet, a so-called electronic commerce (EC) site.

Figure 5:
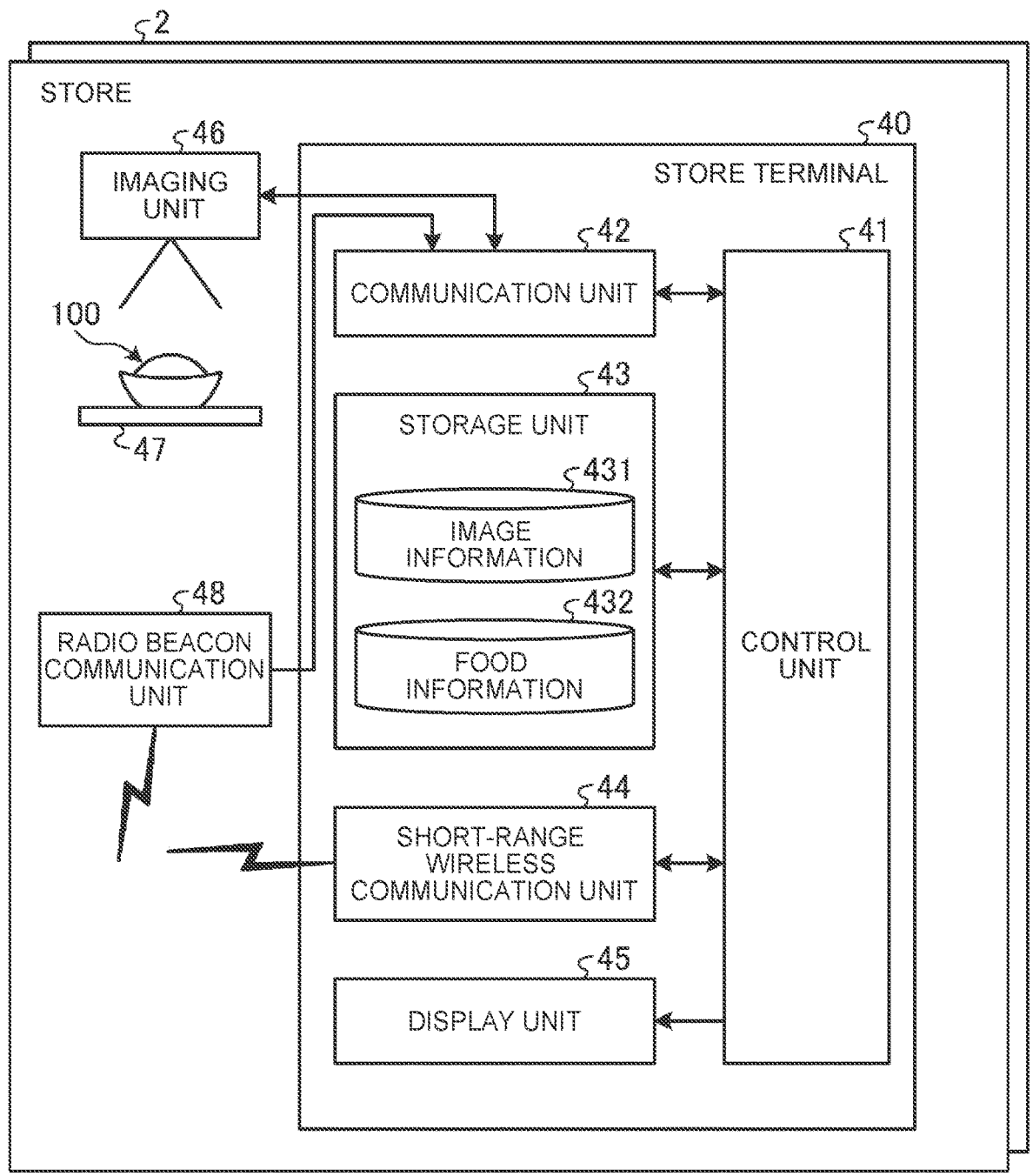
FIG. 5 is a block diagram schematically showing a configuration of a store terminal according to the embodiment.

As shown in FIG. 5, the store terminal 40 includes the control unit 41, a communication unit 42, a storage unit 43, a short-range wireless communication unit 44, and a display unit 45. The control unit 41 as a first processor, the communication unit 42, the storage unit 43, and the short-range wireless communication unit 44 are functionally the same as the control unit 11, the communication unit 12, the storage unit 13, and the short-range wireless communication unit 34, respectively. The display unit 45 is composed of, for example, a liquid crystal display (LCD) and an organic electroluminescence display (OLED), and displays information under the control of the control unit 41. The storage unit 43 includes image information 431 and food information 432.

A store 2 provided with the store terminal 40 is provided with the imaging unit 46 including an imaging device. The imaging unit 46 is configured to be controllable by the control unit 41 via the communication unit 42. The imaging unit 46 can capture the image of the food 100 served on a table 47 in a store such as a restaurant or a cafeteria. The imaging unit 46 is configured to include one or a plurality of imaging devices. Based on the control of the control unit 41, the imaging unit 46 captures the image of the food 100 on the table 47, generates image data in which the food 100 is captured, and outputs the generated image data to the control unit 41 via the communication unit 42. The imaging device of the imaging unit 46 is configured by using an optical system and an image sensor. The optical system is configured by using at least one lens. The image sensor is composed of devices such as a charge-coupled device (CCD) or a complementary metal oxide semiconductor (CMOS), in which the optical system receives the imaged subject image so that the image data is generated. The imaging device that constitutes the imaging unit 46 may be, for example, a digital camera or the like that incorporates an imaging element such as a CCD or a CMOS image sensor (CIS).

The store 2 is further provided with a radio beacon communication unit 48. The radio beacon communication unit 48 has, for example, an infrared beacon (IR beacon) realized by a radio beacon technology using infrared rays, or a communication function conforming to the BLE having a proximity notification function capable of identifying the user terminal 30 by receiving a signal from the target user terminal 30.

Wallet Server Evaluation Collection Method

Next, an evaluation collection method by the wallet system 1 including the wallet server 10 according to the present embodiment will be described. In the following description, information is transmitted and received via the network NW. The description of transmission and reception via the network NW will be omitted. Further, when information is transmitted and received among the wallet server 10, each payment service provider server 20, each user terminal 30, and each store terminal 40, the information is transmitted and received in association with the identification information to independently identify the payment service provider server 20, the user terminal 30, and the store terminal 40. However, the description thereof will also be omitted.

First, an evaluation collection method for collecting evaluations performed immediately after a user is provided with a meal in a store such as a restaurant or a cafeteria and pays for the meal will be described with reference to FIGS. 6 and 7.

Figure 6:
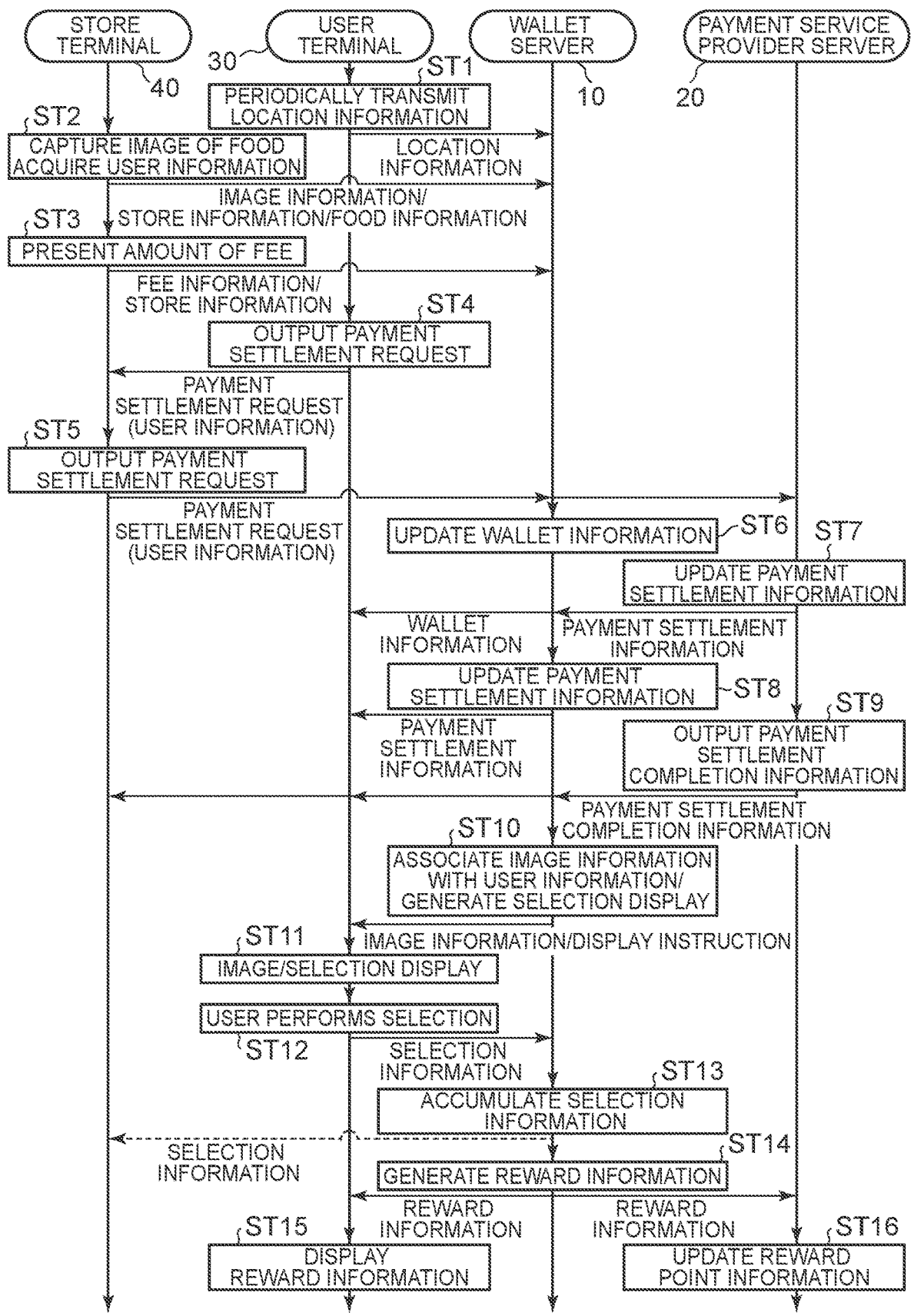
FIG. 6 is a flowchart showing an example of a processing method by the wallet system according to the embodiment.
Figure 7:
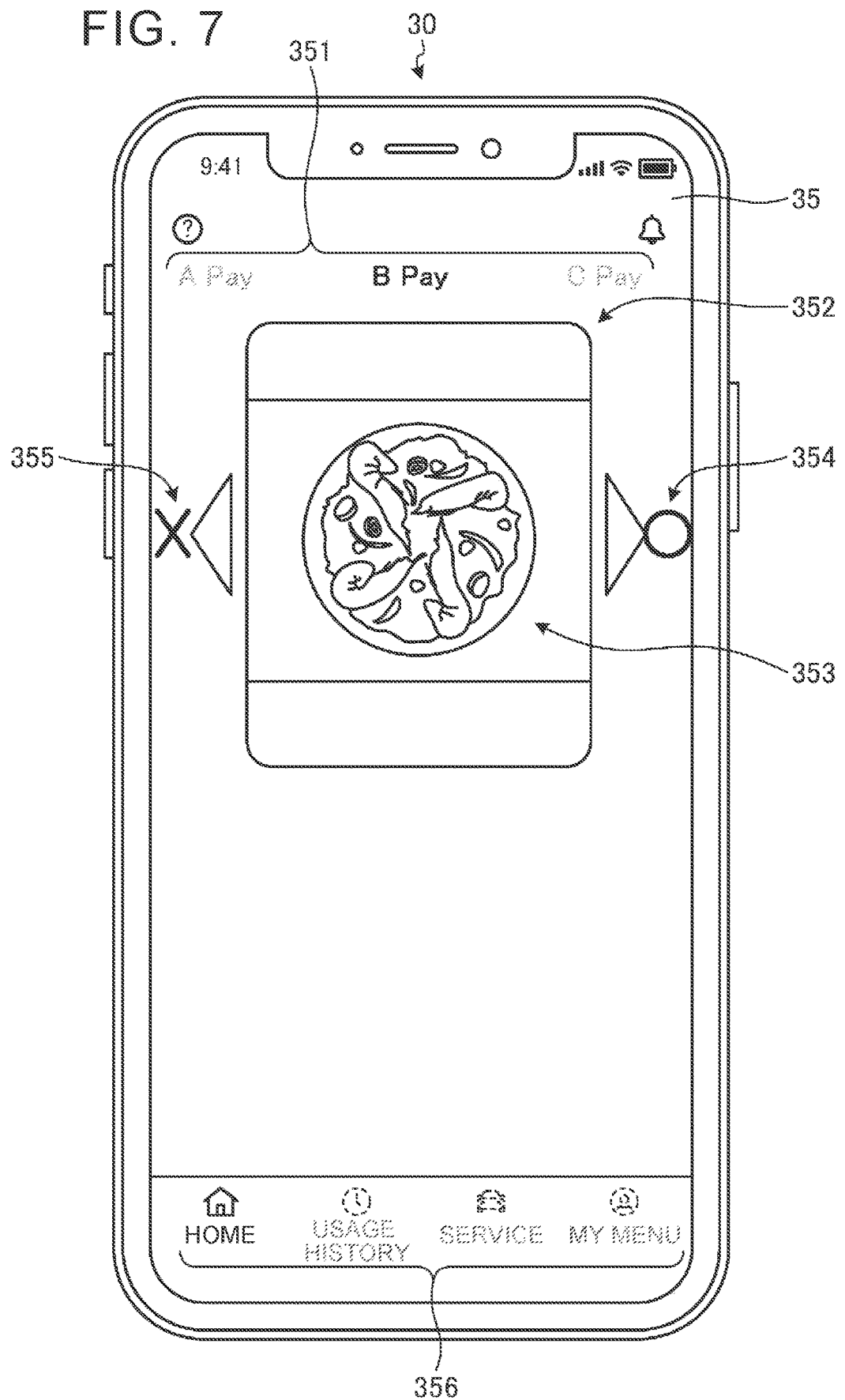
FIG. 7 is a diagram showing an example in which two options are displayed on an operation display unit of the user terminal in the wallet system according to the embodiment.

As shown in FIG. 6, first, in step ST1, the user terminal 30 periodically or timely transmits the location information to the wallet server 10. The received location information in the wallet server 10 is stored in the storage unit 13 as the user information 131.

In step ST2, in the store 2 provided with the store terminal 40, the imaging unit 46 captures an image of the meal on the table 47 that is served to the user or placed before being delivered or handed to the user (hereinafter referred to as food 100). The imaging unit 46 can capture the image of the food 100 immediately after the food 100 is served, or when the food 100 is delivered or handed to the user, immediately after the food 100 is arranged in a container. The store terminal 40 can also acquire user information including a user ID related to the user terminal 30 by communicating between the user terminal 30 possessed by the user and the radio beacon communication unit 48 provided in the store 2. Further, the wallet server 10 can retrieve from the storage unit 13 the user information 131 related to the user terminal 30 of the user who received the food 100, based on the location information transmitted from the user terminal 30. The image data of the captured food 100 is associated with the store information and transmitted to the wallet server 10 as image information. At the same time, the user information acquired by the store terminal 40 may be transmitted to the wallet server 10. The image information includes date and time information including the date and time of imaging.

After that, at the store 2 or the like, the user finishes eating the food 100 or takes out all or part of the food 100. In step ST3, the store 2 urges the user to pay the fee using the store terminal 40. The control unit 41 causes the display unit 45 of the store terminal 40 to display the amount of fee. The store terminal 40 transmits fee information and the store information to the wallet server 10.

Subsequently, in step ST4, the payment settlement processing unit 315 of the user terminal 30 issues, to the store terminal 40, the payment settlement request for settling the payment settlement amount determined in step ST3 using the electronic money deposited in the wallet or by displaying a predetermined code, for example. During the processing above, the payment settlement processing unit 315 of the user terminal 30 may output the user information to the store terminal 40.

Subsequently, in step ST5, the control unit 41 outputs the payment settlement request acquired from the user terminal 30 to the wallet server 10 and the payment service provider server 20. During the processing above, the control unit 41 may output the user information acquired from the user terminal 30 to the wallet server 10 and the payment service provider server 20. Note that, the payment settlement request may be transmitted to only either of the wallet server 10 and the payment service provider server 20. Further, the user information may be transmitted from the store terminal 40 to the wallet server 10 in response to a transmission request from the wallet server 10.

In step ST6, the control unit 11 of the wallet server 10 updates the wallet information 132 stored in the storage unit 13 in accordance with the payment settlement amount. When the control unit 11 receives the user information, the control unit 11 may update the user information 131. The control unit 11 transmits the updated wallet information 132 to the user terminal 30. In step ST7, the control unit 21 of the payment service provider server 20 updates the payment settlement information 233 stored in the storage unit 23 in accordance with the payment settlement amount. The payment service provider server 20 transmits the updated payment settlement information 233 to the wallet server 10.

In step ST8, the control unit 11 of the wallet server 10 updates the payment settlement information 133 stored in the storage unit 23 with the received payment settlement information 233. The control unit 11 transmits the updated payment settlement information 133 to the user terminal 30. Subsequently, in step ST9, the control unit 21 of the payment service provider server 20 transmits payment settlement completion information containing the content indicating that the payment settlement processing is completed to the wallet server 10, the user terminal 30, and the store terminal 40. Note that, the control unit 11 of the wallet server 10 may execute all of steps ST6 to ST9. Further, the control unit 21 of the payment service provider server 20 may execute all of steps ST6 to ST9.

In step ST10, the evaluation generation unit 111 in the control unit 11 of the wallet server 10 associates the acquired and updated user information 131 with the image information 135. Here, as the acquired user information, it is possible to use at least one of the user information acquired by the store terminal 40 in connection with the provision of the food 100 in step ST2 and the user information acquired by the store terminal 40 output by the user terminal 30 when the payment settlement request is output in step ST4. By using both the user information acquired by the store terminal 40 and the user information output by the user terminal 30, the reliability of the association between the image information 135 and the user information 131 can be improved. The evaluation generation unit 111 transmits the image information 135 associated with the user information 131 to the user terminal 30. At the same time, the evaluation generation unit 111 generates a display for prompting evaluation including the image information 135, and transmits the display together with the image information 135 to the user terminal 30. Further, the evaluation generation unit 111 transmits to the user terminal 30 a display instruction for displaying the generated display and the image information 135 on the operation display unit 35.

In step ST11, the display control unit 311 of the user terminal 30 causes the operation display unit 35 to display the first evaluation screen for evaluating the food 100 in response to the display instruction. FIG. 7 shows an example of an evaluation screen 352 displayed on the operation display unit 35 by the display control unit 311. As shown in FIG. 7, the display control unit 311 displays an image 353 based on the image information 135 of the food 100 captured in the store of the store terminal 40 on the evaluation screen 352. That is, the image 353 is an image of the food 100 that the user actually ate or purchased. The display control unit 311 displays on the evaluation screen 352 a display prompting the evaluation generated by the evaluation generation unit 111, and specifically, in FIG. 7, selection displays 354, 355 having two options such as "○ (good evaluation such as deliciousness)" and "x (bad evaluation such as unpleasantness)". The selection displays 354, 355 may be generated by the display control unit 311 of the user terminal 30. In FIG. 7, a payment settlement means switching area 351 and a menu switching area 356 are also displayed under the control of the display control unit 311. As a result, the user can recognize that the payment settlement means used for payment at the time of purchasing the food 100 is, for example, a payment means via "BPay", and can also switch the menu on the same screen.

After that, in step ST12, the user who recognizes the evaluation screen 352 displayed on the operation display unit 35 selects "○" or "x" by a touch operation, a flick operation, or the like. The evaluation information for the food 100 selected by the operation performed by the user is stored in the storage unit 33 as the user selection information 331. The user selection information 331 may include image information of the image displayed on the operation display unit 35. The user selection information 331 is transmitted from the user terminal 30 to the wallet server 10 as selection information.

In step ST13, the control unit 11 of the wallet server 10 stores the received selection information in the storage unit 13 as the selection information 136. The evaluation generation unit 111 stores the user information 131, the image information 135, and the selection information 136 in the storage unit 13 in association with each other. As a result, the evaluation for the food 100 selected by the user can be stored in the storage unit 13. The selection information 136 obtained by the user's selection may be transmitted to the store terminal 40. As a result, even the employees of the store or the like can recognize the evaluation for the food 100 that is actually eaten or purchased by the user, so that the business operator who operates the store can also acquire information for more detailed marketing on the food 100 provided.

Next, in step ST14, the reward calculation unit 112 of the wallet server 10 calculates the reward for the user who performed the evaluation based on the acquired selection information 136 and the user information 131, and generates the reward information 137. The reward information 137 is information on the reward provided to the user for the evaluation performed by the user using the user terminal 30 on the food 100 provided. Here, the reward calculation unit 112 calculates the reward based on the number of times the user performed the evaluation using the user terminal 30, and when posting or the like is made along with the evaluation, the number of posts, the number of input characters, or the like. In this case, the reward calculation unit 112 may calculate the reward so that the higher the number of evaluations by the user, the higher the reward. In addition, the reward may be increased for the user who performed the evaluation for the first time, and for the user who continued the evaluation after the second time, the reward may be increased according to the number of evaluations. Further, when the user for whom the reward is calculated is a user who has received a high evaluation from another user, the reward calculation unit 112 may calculate the reward so that the reward is increased according to the evaluation. Further, a rank may be set according to the number of times the user has performed the evaluation, and the reward calculation unit 112 may calculate the reward for the evaluation based on the rank.

As another specific example of the calculation of the reward, for example, when the payment settlement information 133 includes the information that the amount paid by the user for the food 100 is equal to or greater than a predetermined amount, the reward calculation unit 112 may calculate as the reward a predetermined ratio of the payment settlement amount included in the payment settlement information 133, for example, 0.5%, according to the evaluation performed by the user. That is, the reward calculation unit 112 can calculate the reward such that as the payment settlement amount included in the payment settlement information 133 becomes higher, the reward also becomes higher. The predetermined ratio of the payment settlement amount and the predetermined amount that is the threshold value of the paid amount may also be changed according to the rank and the like set for the user. As described above, various methods can be adopted as the method of calculating the reward for the user who performed the evaluation by the reward calculation unit 112.

The storage unit 13 stores the reward information 137 generated by the reward calculation unit 112. The reward calculation unit 112 transmits the generated reward information 137 to the user terminal 30 via the communication unit 12. The display control unit 311 of the user terminal 30 may display the received reward information 137 on the operation display unit 35 (in step ST15). As a result, the user who possesses the user terminal 30 can recognize the information on the reward for the evaluation performed on the food 100 provided.

On the other hand, the reward calculation unit 112 transmits the generated reward information 137 to the payment service provider server 20 via the communication unit 12. In step ST16, the payment service provider server 20 that receives the reward information 137 generates reward point information and coupon information (hereinafter collectively referred to as reward point information) associated with the user or the user terminal 30 based on the acquired reward information 137, and updates the reward point information 234. That is, the reward information generated in the wallet server 10 may be converted into the reward point information 234 in the payment service provider server 20.

As described above, immediately after the user makes a payment settlement for the food 100 provided in the store, the evaluation collection process for collecting the evaluations performed while actually viewing the image of the food 100 provided to the user is completed.

Next, an evaluation collection method for collecting evaluations performed after a predetermined time or a predetermined number of days has elapsed after the user makes a payment settlement processing in the store 2 such as a restaurant or a cafeteria will be described with reference to FIGS. 8 and 9.

Figure 8:
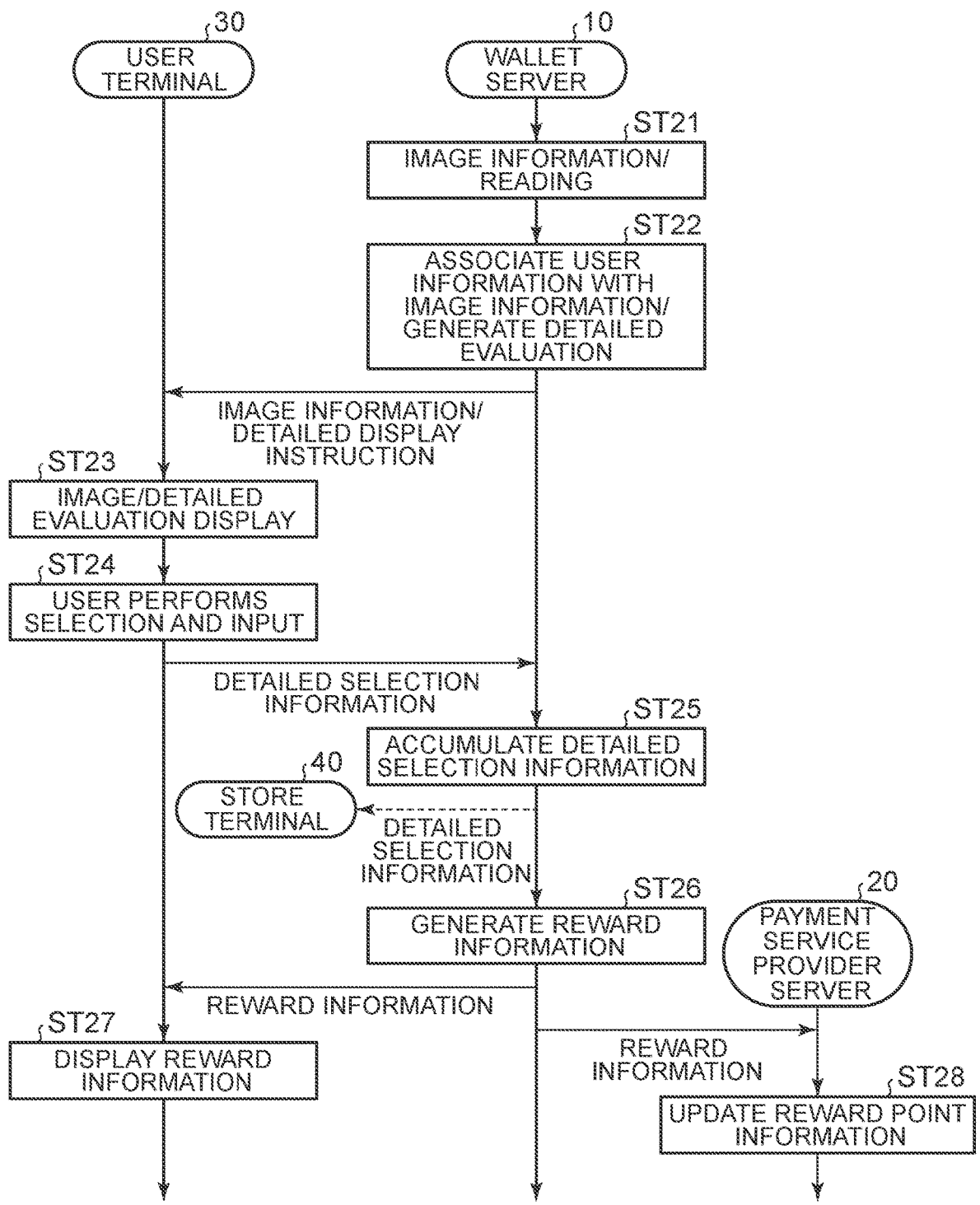
FIG. 8 is a flowchart showing an example of a processing method by the wallet system according to the embodiment.

As shown in FIG. 8, first, in step ST21, the count unit 113 in the control unit 11 of the wallet server 10 retrieves the image information 135 in which the predetermined time has elapsed in the storage unit 13. That is, the count unit 113 determines whether the predetermined time has elapsed from the date and time included in the date and time information based on the date and time information of the payment settlement included in the payment settlement information 133. Note that the count unit 113 may determine whether the predetermined time has elapsed from the date and time included in the date and time information based on the date and time information of the imaging included in the image information 135. The predetermined time can be set from a few hours to several days after the imaging date and time. Specifically, for example, when the predetermined time is one day, the count unit 113 retrieves and reads the image information 135 whose imaging date and time is one day before from the image information 135. The image information 135 read by the count unit 113 is output to the evaluation generation unit 111.

In step ST22, the evaluation generation unit 111 of the wallet server 10 retrieves and reads the user information 131 corresponding to the image information 135 read from the user information 131 from the storage unit 13. The evaluation generation unit 111 associates the input image information 135 with the read user information 131. Here, as the acquired user information, it is possible to use at least one of the user information acquired by the store terminal 40 in connection with the provision of the food 100 in step ST2 and the user information output by the user terminal 30 when the payment settlement request is output in step ST4. The evaluation generation unit 111 transmits the user information 131 and the image information 135 associated with each other to the user terminal 30. At the same time, the evaluation generation unit 111 generates a display (detailed display) for prompting detailed evaluation including the image information 135, and transmits the display (detailed display) together with the image information 135 to the user terminal 30. Further, the evaluation generation unit 111 transmits a detailed display instruction for displaying the generated detailed display and the image information 135 on the operation display unit 35 to the user terminal 30. The detailed display instruction is transmitted at least once, and the display instruction is transmitted a plurality of times together with the display instruction in step ST10.

In step ST23, the display control unit 311 of the user terminal 30 causes the operation display unit 35 to display a detailed evaluation screen for performing a detailed evaluation for the food 100 in response to the detailed display instruction. That is, the operation display unit 35 displays the selection screen for performing the evaluation for the food 100 a plurality of times, in this case, the second evaluation.

FIG. 9 shows an example of a detailed evaluation screen 357 displayed on the operation display unit 35 by the display control unit 311. As shown in FIG. 9, the display control unit 311 displays an image 358 based on the image information 135 of the food 100 captured in the store 2 that owns the store terminal 40 on the detailed evaluation screen 357. That is, the image 358 is an image of the food 100 that the user actually ate or purchased. The display control unit 311 displays a detailed evaluation display 359 including, for example, a plurality of icons 359a and a comment field 359b, which is a display generated by the evaluation generation unit 111 to prompt detailed evaluation. In FIG. 9, for example, five "☆" icons 359a and the comment field 359b are displayed as the detailed evaluation display 359 on the detailed evaluation screen 357. The comment field 359b is an area where a user can input characters by using the operation display unit 35 of the user terminal 30. The detailed evaluation display 359 may be generated by the display control unit 311 of the user terminal 30. In FIG. 9, the payment settlement means switching area 351 and the menu switching area 356 are also displayed under the control of the display control unit 311. As a result, the user can recognize that the payment settlement means used for payment at the time of purchasing the food 100 is, for example, a payment means via "BPay", and can also switch the menu on the same screen.

Returning to FIG. 8, in step ST24, the user who recognizes the detailed evaluation screen 357 displayed on the operation display unit 35 selects an icon by touch operation, flick operation, or the like, or inputs a comment in the comment field 359b. The detailed evaluation information (detailed selection information) for the food 100 selected or input by the operation performed by the user is stored in the storage unit 33 as the user selection information 331. The user selection information 331 may include image information of the image displayed on the operation display unit 35. The detailed selection information included in the user selection information 331 is transmitted from the user terminal 30 to the wallet server 10.

In step ST25, the control unit 11 of the wallet server 10 stores the received detailed selection information in the storage unit 13 as the selection information 136. The evaluation generation unit 111 stores the user information 131, the image information 135, and the selection information 136 in the storage unit 13 in association with each other. As a result, the detailed evaluation for the food 100 input by the user can be stored in the storage unit 13. The detailed selection information obtained by the user selecting or inputting the information may be transmitted to the store terminal 40. As a result, even the employees of the store or the like can recognize the evaluation for the food 100 that is actually eaten or purchased by the user after the lapse of a predetermined time. Therefore, the business operator who operates the store 2 can also acquire information for more detailed marketing of the food 100 provided.

Next, in step ST26, the reward calculation unit 112 of the wallet server 10 calculates the reward for the user who performed the evaluation based on the detailed selection information and the user information 131 included in the acquired selection information 136, and generates the reward information 137. Here, the reward calculation unit 112 can calculate the reward based on the number of times the user has made a detailed evaluation using the user terminal 30, or when a sentence is input in the comment field 359b, the number of posts of the sentence, the number of input characters, and the like. In this case, the reward calculation unit 112 may calculate the reward so that the higher the number of evaluations by the user, the higher the reward. Further, when the user for whom the reward is calculated is a user who has received a high evaluation from another user, the reward calculation unit 112 may calculate the reward so that the reward is increased according to the evaluation. Further, a rank may be set according to the number of times the user has performed the evaluation, and the reward calculation unit 112 may calculate the reward for the evaluation based on the rank. Another specific example of the calculation of the reward is the same as in the case of step ST14, and various methods can be adopted as the method of calculating the reward for the user.

The storage unit 13 stores the reward information 137 generated by the reward calculation unit 112. The reward calculation unit 112 transmits the generated reward information 137 to the user terminal 30 via the communication unit 12. The display control unit 311 of the user terminal 30 may display the received reward information 137 on the operation display unit 35 (in step ST27). As a result, the user who possesses the user terminal 30 can recognize the information on the reward for the evaluation performed on the food 100 provided.

On the other hand, the reward calculation unit 112 transmits the generated reward information 137 to the payment service provider server 20 via the communication unit 12. In step ST28, the payment service provider server 20 that receives the reward information 137 generates reward point information associated with the user or the user terminal 30 based on the acquired reward information 137, and updates the reward point information 234. That is, the reward information generated in the wallet server 10 may be converted into the reward point information 234 in the payment service provider server 20.

As described above, after a predetermined time has elapsed from the time when the user is provided with the food 100 in the store and the food 100 is served, handed, or delivered to the user, the evaluation collection process of collecting the evaluations for the actually provided food 100 is completed.

It has been difficult to evaluate each item of the food 100 in a meal or the like provided in the store 2 such as a restaurant. However, according to the embodiment of the present disclosure described above, the wallet server 10 can collect evaluations for not only the entire store 2 but also each item of the food 100 to be provided, which allows the store 2 and the like to collect and accumulate information for more detailed marketing that is necessary for the store 2 or the like.

Although the embodiment of the present disclosure has been specifically described above, the present disclosure is not limited to the embodiment, and various modifications based on the technical idea of the present disclosure are possible. The present disclosure also includes a configuration in which the components according to the present disclosure are appropriately combined. Further effects and modifications can be easily derived by those skilled in the art. Thus, broader aspects of the present disclosure are not limited to the embodiment, and modifications in various forms can be made. For example, the evaluation screen exemplified in the embodiment is merely an example, and a different evaluation screen may be used as necessary. The present disclosure is not limited by the description and the drawings that constitute a part of the present disclosure according to the present embodiment.

For example, in the present embodiment, a plurality of users may form a group, and one user in the group may perform payment settlement processing on behalf of at least one other user. In this case, the control unit 11 of the wallet server 10 can retrieve from the storage unit 13 each user information 131 of the users constituting the group, based on a predetermined group member determination method in which each individual is determined from the group information. The control unit 11 of the wallet server 10 can associate the user information 131 obtained in this way with the image information of the food 100 provided to each user constituting the group captured in the store 2 or the like. Further, in this case, the user information of the user who has performed the payment settlement processing in the group may be output to the store terminal 40, and the image information, the selection display, and the detailed evaluation display of the food 100 provided to all the members of the group may be transmitted to the user terminal 30 of the representative user.

Further, the wallet system 1 including the wallet server 10 according to the present embodiment can also be used for payment settlement made while the vehicle is in operation when the user terminal 30 is the car navigation system mounted on the vehicle.

Recording Media

According to the embodiment, a program capable of executing a processing method by the wallet server 10, the payment service provider server 20, the user terminal 30, and the store terminal 40 can be recorded in a recording medium that is readable by a computer or other machines or devices (hereinafter referred to as the computer). The computer functions as the control units of the wallet server 10 and the user terminal 30 as the computer is caused to read the program stored in the recording medium and execute the program. Here, the recording medium that is readable by the computer means a non-transitory storage medium that accumulates information such as data and programs through an electrical, magnetic, optical, mechanical, or chemical action and from which the computer can read the information. Examples of the recording media removable from the computer among the recording media above include, for example, a flexible disk, a magneto-optical disk, a compact disc read-only memory (CD-ROM), a compact disc rewritable (CD-R/W), a digital versatile disc (DVD), a Blu-ray disc (BD), a digital audio tape (DAT), a magnetic tape, and a memory card such as a flash memory. In addition, examples of the recording media fixed to the computer include a hard disk and a read-only memory (ROM). Further, a solid state drive (SSD) can be used as the recording medium removable from the computer or as the recording medium fixed to the computer.

Information Processing System

As another embodiment, the functions of the evaluation generation unit 111, the reward calculation unit 112, and the count unit 113 may be divided and executed by a plurality of devices communicable with each other via the network NW.

Other Embodiments

Further, in the wallet server 10, the payment service provider server 20, the user terminal 30, and the store terminal 40 according to the embodiment, the "unit" can be read as a "circuit", for example. For example, the communication unit can be read as a communication circuit.

Further, the program to be executed by the wallet server 10, the payment service provider server 20, the user terminal 30, and the store terminal 40 according to the embodiment may be configured to be stored in a computer connected to a network such as the Internet and executed by being downloaded via the network.

In the description of the flowchart in the present specification, the order of the processing between steps is clarified using expressions such as "first", "after", and "subsequently". However, the order of processing required for realizing the embodiment is not always uniquely defined by those representations. That is, the order of processing in the flowchart described in the present specification can be changed within a consistent range.

Further effects and modifications can be easily derived by those skilled in the art. The broader aspects of the present disclosure are not limited to the particular details and representative embodiments shown and described above. Accordingly, various modifications may be made without departing from the spirit or scope of the general inventive concept as defined by the appended claims and their equivalents.

What is claimed is:

1. A wallet server comprising a processor, the processor being configured to:
    capture, using a camera, an image of food from a store terminal prior to the food being served to a group of users,
    acquire, in response to capturing the image of the food, image date and time information and image user ID information of each of the users of the group provided with the food from the store terminal based on location data periodically transmitted from user terminals of the users to the wallet server,
    acquire payment settling information from the store terminal including payment date and time information and payment user ID information in response to a payment settlement request for purchase of the food being sent from a first user terminal of a representative user of the group of users to the store terminal, the first user terminal of the representative user sending the payment settlement request for purchase of the food on behalf of at least one other user of the group of users,
    associate the image of the food with the group of users based on the acquired image user ID information, the payment user ID information, the image date and time information, the payment date and time information, and the location data of the user terminals, and
    output a display instruction signal to only the first user terminal to simultaneously display, on a display screen of the first user terminal, the captured image of the food and an evaluation form of the food, the first user terminal being identified by the acquired image user ID information, the payment user ID information, the image date and time information, the payment date and time information, and the location data of the first user terminal, the displayed image of the food on the display screen being the image of the food served to the group of users captured by the camera.

2. The wallet server according to claim 1, wherein when an evaluation of the food is inputted to the evaluation form displayed on the first user terminal, the processor calculates a reward for the first user based on information of the evaluation for the food performed by the first user.

3. The wallet server according to claim 1, wherein the processor outputs the display instruction signal after a predetermined time has elapsed from a date and time included in the payment date and time information.

4. The wallet server according to claim 1, wherein the processor outputs the display instruction signal after a predetermined time has elapsed from a date and time when the image of the food was captured.

5. The wallet server according to claim 1, wherein the processor outputs the display instruction signal a plurality of times.

6. The wallet server according to claim 1, wherein the processor outputs the display instruction signal to the first user terminal to display the evaluation form that allows selection from two evaluation options for accepting input of an evaluation of the food when the output display instruction signal is sent for a first time.

7. The wallet server according to claim 6, wherein the processor outputs the display instruction signal to the first user terminal to display the evaluation form having at least three options of evaluation levels for accepting input of the evaluation of the food when the output display instruction signal is sent to the first user terminal from a second time onward.

8. The wallet server according to claim 6, wherein the processor outputs the display instruction signal to the first user terminal to display the evaluation form that allows an input of a character for accepting the input of the evaluation of the food when the output display instruction signal is sent to the first user terminal from a second time onward.

9. The wallet server according to claim 1, wherein:
the store terminal includes a radio communication beacon configured to transmit and receive information to and from the store terminal and communicate with the user terminals; and
the user ID information is acquired by the store terminal through communication between the user terminals possessed by the users and the radio communication beacon.

10. A wallet system comprising:
a first device including a first processor that is installed in a store providing food and that transmits payment settlement information including a content related to payment settlement;
a plurality of second devices, including a first second device of the plurality of second devices including a second processor, the first second device being possessed by a representative user of a group of users and the first second device being configured to transmit selection information when the representative user inputs the selection information; and
a third device including a third processor, the third processor being configured to:
capture, using a camera, an image of food from the first device prior to the food being served to the group of users,
acquire, in response to capturing the image of the food, image date and time information and image user ID information of each of the users of the group provided with the food from the first device based on location data periodically transmitted from the plurality of second devices to the third device,
acquire the payment settling information from the first device including payment date and time information and payment user ID information in response to a payment settlement request for purchase of the food being sent from the first second device, of the plurality of second devices to the first device, the first second device sending the payment settlement request for purchase of the food on behalf of at least one other second device of the plurality of second devices,
associate the image of the food with the group of users based on the acquired image user ID information, the payment user ID information, the image date and time information, the payment date and time information, and the location data of the plurality of second devices, and
output a display instruction signal to only the first second device of the plurality of second devices to simultaneously display, on a display screen of the first second device, the captured image of the food and an evaluation form of the food for inputting the selection information, the first second device being identified by the acquired image user ID information, the payment user ID information, the image date and time information, the payment date and time information, and the location data of the first second device, the displayed image of the food on the display screen being the image of the food served to the group of users captured by the camera.

11. The wallet system according to claim 10, wherein when an evaluation of the food is inputted to the evaluation form displayed on the first second device, the third processor calculates a reward for the representative user based on information of the evaluation for the food performed by the representative user.

12. The wallet system according to claim 10, wherein the third processor outputs the display instruction signal after a predetermined time has elapsed from a date and time included in the payment date and time information for purchase of the food, or after a predetermined time has elapsed from a date and time included in the image date and time information when the image of the food was captured.

13. The wallet system according to claim 10, wherein the third processor transmits the display instruction signal to the first second device a plurality of times.

14. The wallet system according to claim 10, wherein the third processor outputs the display instruction signal to the first second device to display the evaluation form that allows selection from two evaluation options for accepting input of an evaluation of the food when the output display instruction signal is sent for a first time.

15. The wallet system according to claim 14, wherein the third processor outputs the display instruction signal to the first second device to display the evaluation form having at least three options of evaluation levels for accepting input of an evaluation of the food when the output display instruction signal is sent to the first second device from a second time onward.

16. The wallet system according to claim 14, wherein the third processor outputs the display instruction signal to the first second device to display the evaluation form that allows an input of a character for the evaluation of the food when the output display instruction signal is sent to the first second device from a second time onward.

17. The wallet system according to claim 10, wherein:
the first device includes a radio communication beacon configured to transmit information to the first device and communicate with the second devices; and
the user ID information is acquired by the first device through communication between the second devices possessed by the users and the radio communication beacon.

18. A non-transitory computer-readable recording medium storing a program that, when executed, causes a processor to execute:

capturing, using a camera, an image of food from a store terminal prior to the food being served to a group of users, acquiring, in response to capturing the image of the food, image date and time information and image user ID information of each of the users of the group provided with the food from the store terminal based on location data periodically transmitted from user terminals of the users to the wallet server, acquiring payment settling information from the store terminal including payment date and time information and payment user ID information in response to a payment settlement request for purchase of the food being sent from a first user terminal of a representative user of the group of users to the store terminal, the first user terminal of the representative user sending the payment settlement request for purchase of the food on behalf of at least one other user of the group of users, associating the image of the food with the group of users based on the acquired image user ID information, the payment user ID information, the image date and time information, the payment date and time information, and the location data of the user terminals, and outputting a display instruction signal to only the first user terminal to simultaneously display, on a display screen of the first user terminal, the captured image of the food and an evaluation form of the food, the first user terminal being identified by the acquired image user ID information, payment user ID information, the image date and time information, the payment date and time information, and the location data of the first user terminal, the displayed image of the food on the display screen being the image of the food served to the group of users captured by the camera.

* * * * *